United States Patent [19]

Sugawara et al.

[11] Patent Number: 5,092,420
[45] Date of Patent: Mar. 3, 1992

[54] THROTTLE VALVE POSITION CONTROLLING APPARATUS AND SLIP CONTROLLING APPARATUS

[75] Inventors: Hayato Sugawara; Kenji Ohta, both of Katsuta, Japan

[73] Assignees: Hitachi, Ltd., Tokyo; Hitachi Automotive Engineering, Ltd., Ibaraki, both of Japan

[21] Appl. No.: 444,940

[22] Filed: Dec. 4, 1989

[30] Foreign Application Priority Data

Dec. 22, 1988 [JP] Japan .................. 63-322096

[51] Int. Cl.⁵ .................. B60K 28/16; F16K 31/04
[52] U.S. Cl. .................. 180/197; 123/399; 364/426.02
[58] Field of Search .................. 123/399, 494; 364/426.03, 426.02; 180/197

[56] References Cited

U.S. PATENT DOCUMENTS

| | | | |
|---|---|---|---|
| 4,637,487 | 1/1987 | Nakamura et al. | 180/197 |
| 4,763,264 | 8/1988 | Okuno et al. | 123/399 |
| 4,768,608 | 9/1988 | Hrovat | 180/197 |
| 4,799,467 | 1/1989 | Ishikawa et al. | 123/399 |
| 4,811,713 | 3/1989 | Shimada et al. | 123/399 |
| 4,811,808 | 3/1989 | Matsumoto et al. | 180/197 |
| 4,866,618 | 9/1984 | Tamura et al. | 180/197 |
| 4,985,837 | 1/1991 | Togai et al. | 364/426.02 |

*Primary Examiner*—Mitchell J. Hill
*Attorney, Agent, or Firm*—Antonelli, Terry, Stout & Kraus

[57] ABSTRACT

A throttle valve position controlling apparatus comprises a motor serving to adjust the opening degree of a throttle valve disposed in an intake pipe of an engine, an air flow sensor attached to the intake pipe so as to detect an intake air amount, and a throttle control unit which is operative to obtain a deviation between a command air amount set beforehand and the intake air amount detectd by the air flow sensor and to effect a feed back control on the motor so as to minimize the deviation to zero. A slip controlling apparatus comprises revolution sensors for detecting the number of revolutions of driving wheels and driven wheels of a car, a slip control unit which has a table in which command air amounts are set beforehand in correspondence with the degree of slip and is operative to judge whether or not the car is in the state of slip from the results of detection by the revolution sensors and to retrieve the table, when the car is in the state of slip, so as to obtain a command air amount corresponding to the judged degree of slip.

6 Claims, 4 Drawing Sheets

THROTTLE VALVE POSITION CONTROLLING APPARATUS AND SLIP CONTROLLING APPARATUS

BACKGROUND OF THE INVENTION

The present invention relates to a throttle valve position controlling apparatus for an engine and a slip controlling apparatus, and more particularly, to a throttle valve position controlling apparatus and a slip controlling apparatus which does not use any throttle valve position sensor to detect the opening degree of the throttle valve.

The opening degree of the throttle valve of the engine is adjusted in correspondence to the amount of actuating of the accelerator pedal; however, it is necessary to adjust the valve opening degree without actuation of the accelerator pedal during idling, for example. Therefore, there exists a throttle valve which can be driven by a motor as well. Further, there also exists a tandem throttle valve which has a sub throttle valve whose opening degree is adjusted by a motor, in addition to a main throttle valve, the opening degree of which is adjusted by the accelerator pedal.

In order to exactly control the valve opening degree with use of a motor, a throttle valve position sensor is required which serves to detect the valve opening degree or the valve position exactly. There are two types of throttle valve position sensors, that is, contact type and non-contact type. The contact type throttle valve position sensor has a disadvantage that the component part suffers abrasion. In particular, since the throttle valve driven by the motor is used frequently at the opening degrees around its full-closed position, abrasion is notable in the vicinity of the full-closed position. Abrasion of the throttle valve position sensor hinders the detection of the throttle valve position from being effected exactly, thereby making it impossible to control the engine correctly. In order to avoid this disadvantage, it is possible to use a non-contact type throttle valve position sensor However, the non-contact type throttle valve position sensor is expensive.

SUMMARY OF THE INVENTION

A first object of the present invention is to provide a throttle valve position controlling apparatus which is capable of adjusting the opening degree of the throttle valve using a motor but no throttle valve position sensor.

A second object of the present invention is to provide a slip controlling apparatus having the throttle valve position controlling apparatus described above.

A throttle valve position controlling apparatus according to the present invention comprises a motor which is operated to adjust the opening degree of a throttle valve disposed in an intake pipe of an engine, an air flow sensor attached to the intake pipe so as to detect an intake air amount, and a throttle control unit which is operative to obtain a deviation between a command air amount set beforehand and the intake air amount detected by the air flow sensor and to effect a feed back control on the motor so as to minimize the deviation to zero.

The throttle control unit is operative to obtain the deviation after compensating the detection delay of the air flow sensor with a first order lead.

A slip controlling apparatus according to the present invention comprises revolution sensors for detecting the number of revolutions of the driving wheels and driven wheels of a car, a slip control unit which has a table in which command air amounts are set beforehand in correspondence with the different degrees of slip, and is operative to judge whether or not the car is in the state of slip from the results of detection by the revolution sensors and to retrieve the table, when the car is in the state of slip, so as to obtain a command air amount corresponding to the judged degree of slip, a motor serving to adjust the opening degree of a throttle valve disposed in an intake pipe of an engine, an air flow sensor attached to the intake pipe so as to detect an intake air amount, and a throttle control unit which is operative to obtain a deviation between the intake air amount detected by the air flow sensor and the command air amount obtained by the slip control unit and to effect a feed back control on the motor so as to minimize the deviation to zero.

In one embodiment, the slip control unit is operative to obtain a difference in number of revolutions between the driving wheels and the driven wheels and to make a judgement, when the difference in number of revolutions becomes greater than a predetermined number, that the car is in the state of slip, the slip control unit having a table in which command air amounts are set beforehand in correspondence with the difference in number of revolutions.

In another embodiment, the slip control unit is operative to obtain a rate of change of the difference in number of revolutions between the driving wheels and the driven wheels and to make a judgement, when the rate of change of the difference in number of revolutions becomes greater than a predetermined rate of change, that the car is in the state of slip, the slip control unit having a table in which command air amounts are set beforehand in correspondence with the rate of change of the difference in number of revolutions.

In a different embodiment, the slip control unit is operative to obtain a slip ratio of the car and to make a judgement, when the slip ratio becomes greater than a predetermined slip ratio, that the car is in the state of slip, the slip control unit having a table in which command air amounts are set beforehand in correspondence with the slip ratio.

DESCRIPTION OF THE PREFERRED EMBODIMENTS

Description will be given below of the present invention with reference to the drawings.

Figure 1:
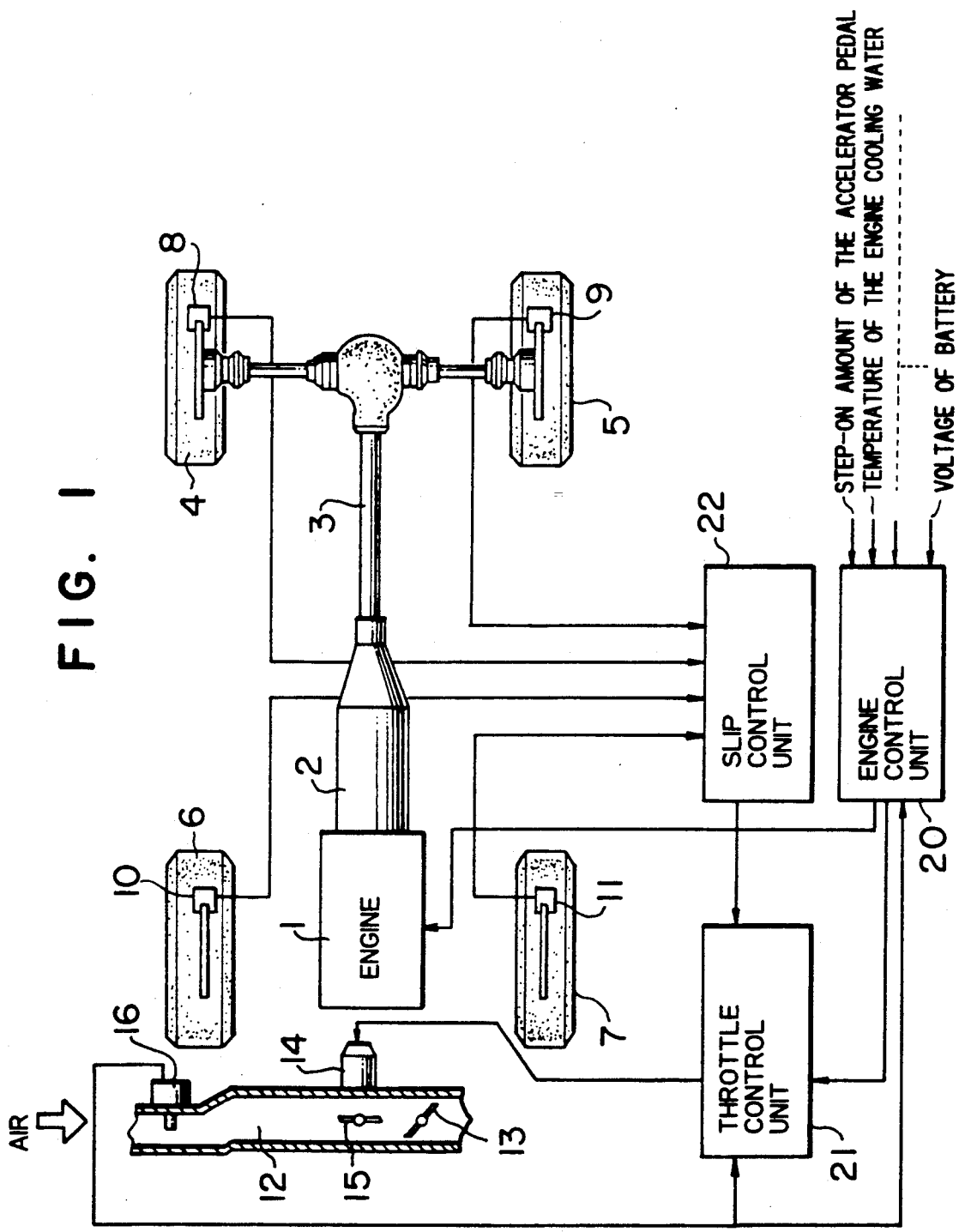
FIG. 1 is a schematic view of the control system of a car which is equipped with a throttle valve position controlling apparatus and a slip controlling apparatus according to the present invention.

FIG. 1 is a block diagram of a control system of a rear-wheel-drive car on which a throttle valve position controlling apparatus and a slip controlling apparatus according to the present invention are mounted.

Power of an engine 1 mounted on this type of car is transmitted through a transmission 2 and a propeller shaft 3 to rear wheels 4 and 5, so that these rear wheels 4, 5 are caused to rotate to make the car move forward while front wheels 6 and 7 are rotated following the driving wheels 4, 5 by virtue of the frictional forces set up with the road surface. The wheels 4, 5, 6 and 7 have revolution sensors 8, 9, 10 and 11, respectively, attached to their own axles. An intake pipe 12 of the engine 1 is provided with a main throttle valve 13 the opening degree of which is adjusted in response to the amount of actuation of an accelerator pedal (not shown), a sub throttle valve 15 the opening degree of which is adjusted by means of a motor 14, and an air flow sensor 16 for detecting the intake air amount.

Further, there are mounted on the car shown in FIG. 1 a throttle control unit 21 and a slip control unit 22, in addition to an engine control unit 20.

The engine control unit 20 operates to calculate the command air amount, the fuel injection rate, the ignition timing and the like by making use of engine operating condition parameters such as the intake air amount, the amount of actuation of the accelerator pedal, the temperature of engine cooling water, the concentration of oxygen contained in exhaust gas and the voltage of the battery, in such a manner as to attain an optimum air fuel ratio or an excellent accelerating performance, thereby controlling the engine 1.

The throttle control unit 21 operates to control the motor 14 so as to make the intake air amount equal to the command air amount given by the engine control unit 20 or the slip control unit 22 to be described later, in the manner to be described later. On the other hand, the slip control unit 22 operates, when a slipping of the driving wheels 4, 5 is detected from the detection signals received from the revolution sensors 8 to 10 on a road having low friction coefficient or the like, to suppress an excessive slip of the driving wheels 4, 5 in the manner to be described later as well.

Figure 2:
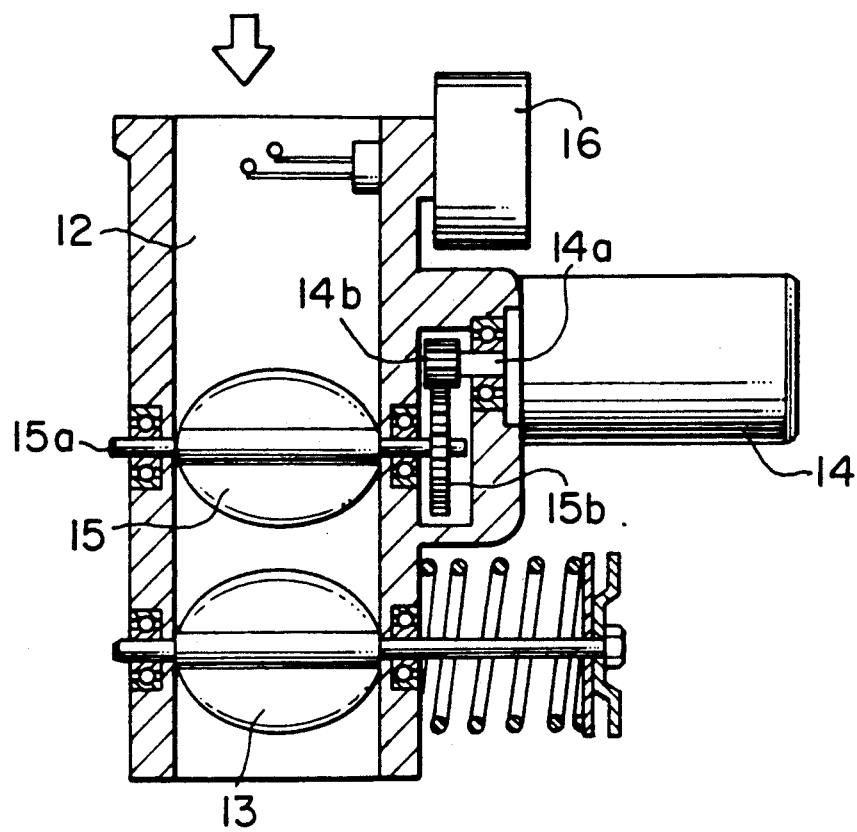
FIG. 2 is a schematic sectional view of a tandem throttle valve in which the throttle valve position controlling apparatus according to the present invention is applied to a sub throttle valve thereof.

FIG. 2 is a detailed view of the intake pipe section. As shown in FIG. 1, the air flow sensor 16, the sub throttle valve 15 and the main throttle valve 13 are disposed in the mentioned order from the upstream side of the intake pipe 12. The opening degree of the main throttle valve 13 is adjusted by the movement of the accelerator pedal, which is not shown, through a wire linkage which is not shown. A gear 15b is fitted on a rotary shaft 15a of the sub throttle valve 15, and a pinion 14b fitted on a rotary shaft 14a of the motor 14 is maintained in meshing engagement with the gear 15b. Therefore, as the rotary shaft 14a of the motor 14 is made to rotate through the desired angle under the control of the throttle control unit 21, the rotary shaft 15a of the sub throttle valve 15 is rotated correspondingly, thereby adjusting the opening degree of the sub throttle valve 15.

The amount of air passing through the portion of the intake pipe 12 where the main and sub throttle valves 13 and 15 are disposed depends upon the smaller one of the opening degrees of the main and sub throttle valves 13 and 15 in addition to the number of revolutions of the engine. Therefore, in case that the driver steps on the accelerator pedal to a great extent to increase the opening degree of the main throttle valve 13 (or to completely open the valve), the amount of air flowing into the combustion chamber of the engine can be suppressed by decreasing the opening degree of the sub throttle valve 15 (or by closing the valve).

On the other hand, in the normal running condition, there is caused no slip of the wheels, so that only the main throttle valve 13 is needed which is linked to the accelerator pedal operated by the driver. In this condition, therefore, the sub throttle valve 15 is held in its full-open position lest it should have an effect upon the other controls.

Next, description will be given of the control for suppressing slipping of the driving wheels and the control of the throttle valve position.

The car shown in FIG. 1 is of the rear-wheel-drive type, in which the front wheels 6 and 7 are driven wheels. Therefore, in the conditions other than braking condition, the front wheels 6 and 7 are prevented from slipping easily and, accordingly, it is considered that the speed of the car is the average of speeds obtained from the numbers of revolutions of the front wheels 6 and 7. Further, in this case, the power can be transmitted satisfactorily from the driving rear wheels 4 and 5 to the road surface.

Figure 3:
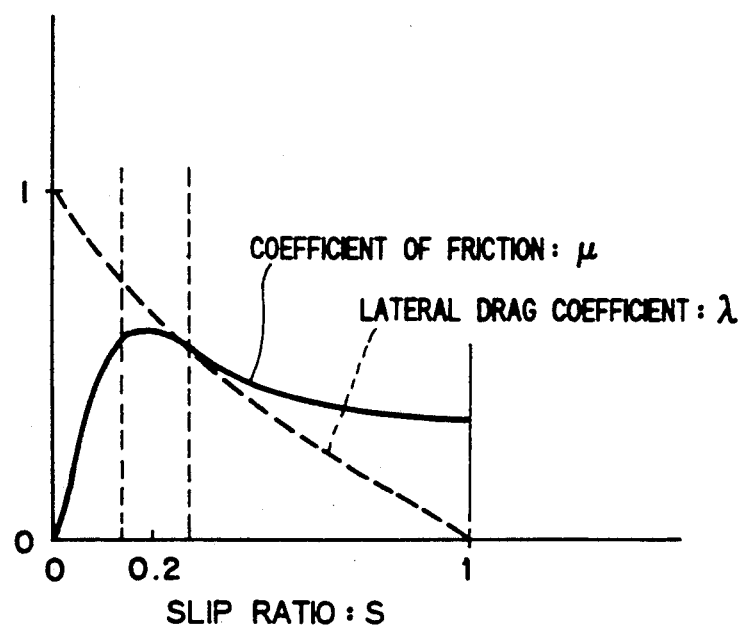
FIG. 3 is a graph showing the relationship between the slip ratio and the friction coefficient and the lateral drag coefficient

FIG. 3 is a graph showing the relationship between the slip ratio S (=(number of revolutions of driving wheel—number of revolutions of driven wheel)/number of revolutions of driven wheel) and the friction coefficient $\mu$ and the lateral drag coefficient $\lambda$. It is seen from this graph that if the slip ratio S takes a large value at the time of the occurrence of slip of the driving wheel, not only the friction coefficient $\mu$ decreases, but also the lateral drag coefficient $\lambda$ decreases sharply. In other words, on slipping, the car behaves in an unstable manner due to rapid decrease of the cornering force thereof, thus giving rise to a problem from the viewpoint of safety. To cope with this, in case of the slipping of the driving wheel, the number of revolutions of the driving wheel is decreased so as to control the slip ratio S to take a value around 0.2 at which both the friction coefficient $\mu$ and the lateral drag coefficient $\lambda$ are allowed to take the suitable values. This control is effected by the slip control unit 22. The slip control unit 22 is operative, when the slip ratio S becomes greater than a predetermined value, to set the command air amount in accordance with that slip ratio at a value somewhat smaller than the air amount determined on the basis of the actual amount of the actuation of accelerator pedal and then send to the throttle control unit 21 an instructive signal corresponding to the command air amount thus set. In this way, the intake air amount is decreased, thereby reducing the torque of the driving wheel and decreasing the number of revolutions of the driving wheel. Incidentally, in the case of the present embodiment, the throttle control unit 21 is not operated before such control is performed and the sub throttle valve 15 is held in its full-open position, as mentioned before.

The slip control unit 22 has a table in which different command air amounts are set beforehand in correspondence with respective degrees of slip and is operative to judge whether or not the car is in the state of slip from the results of detection by the respective revolution sensors 8, 9, 10 and 11 which serve to detect the numbers of revolutions of the driving wheels 4, 5 and the driven wheels 6, 7. If it is judged that the car is in the state of slip, the slip control unit 22 operates to retrieve the table so as to obtain a command air amount corresponding to the judged degree of slip and, then, sends to the throttle control unit 21 the thus-obtained command air amount.

Judgement on whether the car is in the state of slip or not is made when the difference in number of revolutions between the driving wheels 4, 5 and the driven wheels 6, 7 becomes greater than a predetermined value. In this case, the command air amounts are set in the table beforehand in correspondence with the difference in number of revolutions. Further, judgement on whether the car is in the state of slip or not may be made when the rate of change of the difference in number of revolutions between the driving wheels 4, 5 and the driven wheels 6, 7 becomes greater than a predetermined value. In this case, the command air amounts are set in the table beforehand in correspondence with the rate of change of the difference in number of revolutions. Furthermore, in judging whether or not the car is in the state of slip, when the slip ratio of the car driven from the results of detection by the revolution sensors 8, 9, 10 and 11 becomes greater than a predetermined slip ratio, it may be judged that the car is in the state of slip. In this case, the command air amounts are set in the table beforehand in correspondence with the slip ratio. Still furthermore, it goes without saying that the command air amount can be obtained as a function value of difference in number of revolutions, slip ratio or the like in accordance with a predetermined calculation formula, in place of the retrieval value from the table.

Figure 4:
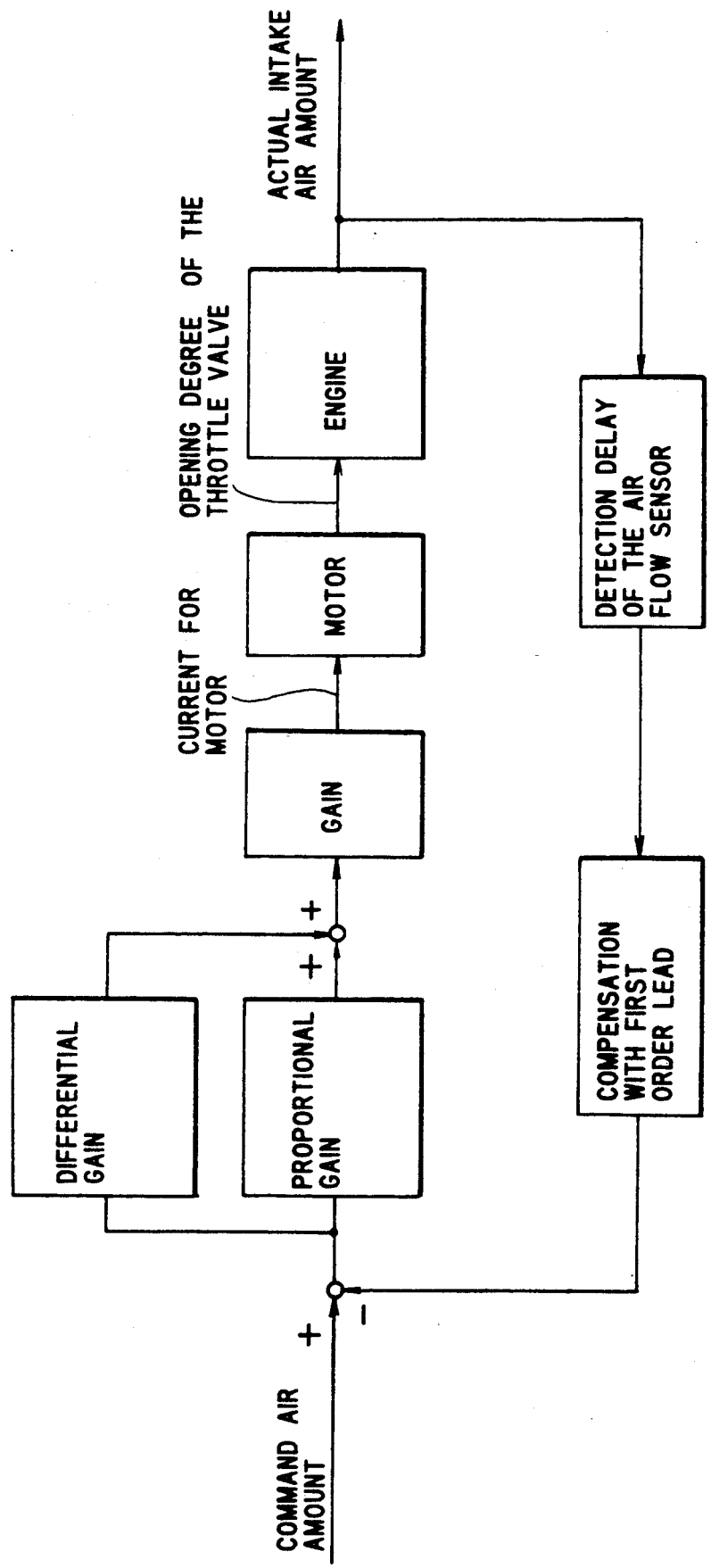
FIG. 4 is a block diagram illustrating the controlling operation effected by the throttle valve position controlling apparatus according to the present invention.

In the throttle control unit 21 to which an instructive signal indicative of the command air amount is sent from the slip control unit 22, a deviation between the command air amount and an actual intake air amount detected by the air flow sensor 16 is obtained and then multiplied by the proportional gain and the differential gain separately, the results thus obtained being summed up so as to determine the driving amount of the motor 14 or the current value of the motor, as shown in FIG. 4. Then, the throttle control unit 21 operates to supply the electric current thus determined to the motor 14 so that the motor 14 is driven to move the sub throttle valve 15 toward its closed position. As a result, the sub throttle valve 15 acts to change the intake air amount of the engine system rather than the main throttle valve 13. Then, the changed intake air amount is detected by the air flow sensor 16. The actual intake air amount thus detected is compared with the command air amount and fed back so as to be equalized to the latter. However, in this case, since there exists a detection delay of in air flow sensor 16, if the actual intake air amount detected is fed back as it is, it is feared that the control system begins to oscillate. To cope with this, in the present embodiment, after compensating the detection delay of the air flow sensor 16 with a first order lead, the deviation from the command air amount is obtained.

In this way, the intake air amount is reduced to thereby reduce the torque of the driving wheel, while the slip ratio is reduced to thereby increase the stability of the car body. After the car escapes from the state of slip, the control by the slip control unit 22 is discontinued and switched over to the normal control by the engine control unit 20. Namely, the throttle control unit 21 receives an instruction of the command air amount from the engine control unit 20 and effects a feed back control on the motor 14 in order to make the intake air amount agree with the command air amount as mentioned before.

Figure 5:
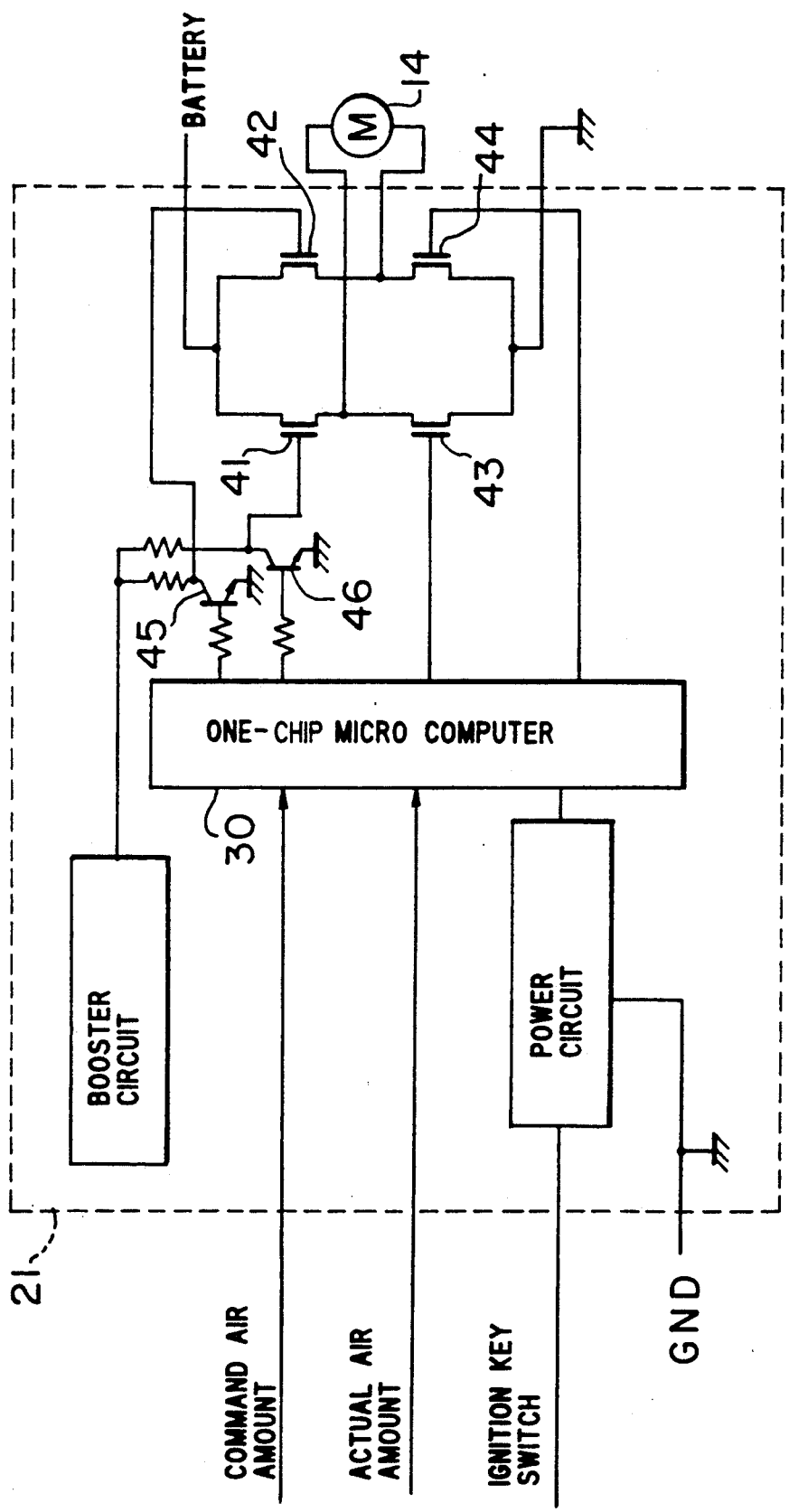
FIG. 5 is a circuit diagram of an example of the throttle valve position controlling apparatus according to the present invention.

FIG. 5 is a circuit diagram showing an example of the throttle control unit 21. In the present embodiment, a one-chip microcomputer 30 is used so as to effect PWM control on the motor 14 by making use of four FET 41-44. The one-chip microcomputer 30 is constituted by CPU, ROM, RAM register, A/D converter, input/output port, timer, PWM control unit and the like, and takes in the command air amount instructed from the slip control unit 22 and the actual intake air amount detected by the air flow sensor 16. The CPU determines the current value of the electric current to be passed through the motor 14 and makes the FET 41 or 42 turn on and off at the duty ratio corresponding to the current value thus determined, thereby permitting an electric current to pass through the motor 14. In case that the motor 14 is operated to make the sub throttle valve 15 rotate toward its open position, under such conditions that the FET 44 is turned on and the FET 42, 43 are turned off, the FET 41 is turned on and off in response to the pulse signal produced at the duty ratio determined by the CPU. This permits a chopping current to flow from the battery to the FET 44 via the FET 41 and the motor 14. In case that the sub throttle valve 15 is rotated toward its closed position, under such conditions that the FET 43 is turned on and the FET 41, 44 are turned off, the FET 42 is turned on and off in response to the pulse signal produced at the duty ratio determined by the CPU. This permits a chopping current to flow from the battery to the FET 43 via the FET 42 and the motor 14. It is noted that the duty ratio can be changed by changing the values to be set in the register. Incidentally, reference numerals 45 and 46 denote driving transistors of the FET 41-44. The throttle control unit 21 can be reduced in size and weight and the reliability of the circuit can be improved, provided that the microcomputer 30, FET 41-44, transistors 45, 46 and the like which can be all made by semiconductor technology are formed in one chip.

According to the described embodiment, since the movement of the sub throttle valve can be controlled with use of the existing air flow sensor, the number of the component parts can be reduced so that it becomes possible to assemble an inexpensive throttle valve control system. Further, since the throttle valve position sensor is not required, the reliability of the control system can be improved as compared with the case where the throttle valve position sensor is used, to the extent that it corresponds to the trouble ratio of that sensor.

Although the existence of the state of slip is detected by making use of the revolution sensors 8-11 in the described embodiment, it is also possible to detect the existence of the state of slip by providing an absolute speed sensor in place of the revolution sensors. Further, it is possible to attach a throttle valve position controlling apparatus to the main throttle valve 13 linked to the accelerator pedal, without using the sub throttle valve 15, so as to perform the adjustment of valve opening degree mentioned above. In addition, the description has referred to the rear-wheel-drive car; and however, the same effects can be attained also in the front-wheel-drive car. Furthermore, it goes without saying that the present invention is still applicable to two-wheeled vehicles and motor tricycles.

According to the present invention, the throttle valve position sensor becomes unnecessary, so that the cost can be reduced correspondingly and the reliability can be improved.

What is claimed is:

1. A throttle valve position controlling apparatus comprising:
    a motor coupled to a throttle valve disposed in an intake pipe of an engine to adjust the opening degree of said throttle valve;
    means for providing a command air amount;
    an air flow sensor attached to said intake pipe so as to detect an intake air amount; and
    a throttle control unit which is operative to generate a motor control signal directly representing a deviation between said command air amount and an intake air amount detected by said air flow sensor and to supply said motor control signal to said motor to effect a feed back control on said motor so as to minimize said deviation to zero.

2. A throttle valve position controlling apparatus, comprising:
    a motor coupled to a throttle valve disposed in an intake pipe of an engine to adjust the opening degree of said throttle valve;
    means for providing a command air amount;
    an air flow sensor attached to said intake pipe so as to detect an intake air amount; and
    a throttle control unit including control means for producing a signal directly representing a deviation between said command air amount and an intake air amount detected by said air flow sensor and for effecting a feed back control on said motor by controlling said motor directly on the basis of said signal representing said deviation so as to minimize said deviation to zero, wherein said control means includes means for producing a signal representing intake air amount by advancing a signal from said air flow sensor in phase to thereby compensate a detection delay of said air flow sensor.

3. A slip controlling apparatus comprising:
    revolution sensors for detecting the number of revolutions of driving wheels and driven wheels of a car;
    a slip control unit which has a table in which respective command air amounts are set beforehand in correspondence with respective degrees of slip, and is operative to judge whether or not the car is in a state of slip from results of detection by said revolution sensors and to retrieve said table, when the car is in the state of slip, so as to obtain a command air amount corresponding to the judged degree of slip;
    a motor serving to adjust the opening degree of a throttle valve disposed in an intake pipe of an engine;
    an air flow sensor attached to said intake pipe so as to detect an intake air amount; and
    a throttle control unit which is operative to generate a motor control signal directly representing a deviation between the intake air amount detected by said air flow sensor and the command air amount obtained by said slip control unit and to supply said motor control signal to said motor to effect a feed back control on said motor so as to minimize said deviation to zero.

4. A slip controlling apparatus according to claim 3, wherein said slip control unit is operative to obtain a difference in number of revolutions between said driving wheels and said driven wheels and to make a judgement, when said difference in number of revolutions becomes greater than a predetermined number, that the car is in the state of slip, said slip control unit having a table in which command air amounts are set beforehand in correspondence with the difference in number of revolutions.

5. A slip controlling apparatus according to claim 3, wherein said slip control unit is operative to obtain a rate of change of the difference in number of revolutions between said driving wheels and said driven wheels and to make a judgement, when said rate of change of the difference in number of revolutions becomes greater than a predetermined rate of change, that the car is in the state of slip, said slip control unit having a table in which command air amounts are set beforehand in correspondence with the rate of change of the difference in number of revolutions.

6. A slip controlling apparatus according to claim 3, wherein said slip control unit is operative to obtain a slip ratio of the car from the results of detection by said revolution sensors and to make a judgement, when said slip ratio becomes greater than a predetermined slip ratio, that the car is in the state of slip, said slip control unit having a table in which command air amounts are set beforehand in correspondence with the slip ratio.

* * * * *